United States Patent [19]

Fatehi et al.

[11] Patent Number: 5,317,439
[45] Date of Patent: May 31, 1994

[54] AUTOMATIC ON-LINE MONITORING AND OPTIMIZATION OF OPTICAL NETWORK SWITCHING NODES

[75] Inventors: Mohammad T. Fatehi, Middletown; Fred L. Heismann, Freehold, both of N.J.

[73] Assignee: AT&T Bell Laboratories, Murray Hill, N.J.

[21] Appl. No.: 914,302

[22] Filed: Jul. 17, 1992

[51] Int. Cl.⁵ .......................................... H04B 10/08
[52] U.S. Cl. ................................. 359/110; 359/117; 379/15
[58] Field of Search ............... 359/110, 117, 124, 128, 359/139, 155, 161, 166, 167, 173, 177; 379/6, 15, 16, 17; 375/10; 370/17; 371/24, 20.3, 25.1

[56] References Cited

U.S. PATENT DOCUMENTS

| | | | |
|---|---|---|---|
| 4,278,850 | 7/1981 | Sato et al. | 179/175.31 R |
| 4,301,536 | 11/1981 | Favin | 371/20.3 |
| 4,417,337 | 11/1983 | Favin | 371/20.3 |
| 4,773,071 | 9/1988 | Nielsen | 371/25.1 |
| 4,881,229 | 11/1989 | Kaltbeitzel | 371/20.4 |
| 4,887,309 | 12/1989 | Andersson et al. | 455/601 |
| 4,899,043 | 2/1990 | Mochizuki et al. | 250/227 |
| 4,911,515 | 3/1990 | So et al. | 350/96.16 |
| 4,918,396 | 4/1990 | Halemane et al. | 330/4.3 |
| 4,937,851 | 6/1990 | Lynch | 379/6 |
| 5,066,118 | 11/1991 | Buerli | 356/73.1 |
| 5,069,544 | 12/1991 | Buerli | 356/73.1 |
| 5,218,465 | 6/1993 | Lebby | 359/110 |

FOREIGN PATENT DOCUMENTS

| | | | |
|---|---|---|---|
| 0221534 | 12/1983 | Japan | 359/117 |
| 0153938 | 6/1988 | Japan | 359/117 |

*Primary Examiner*—Leslie Pascal
*Attorney, Agent, or Firm*—Robert P. Marley

[57] ABSTRACT

An on-line technique which allows the monitoring and adjustment of switching node control parameters within an optical network. More specifically, a technique wherein a low-frequency modulation is induced upon an optical signal as it passes through a node within a switch or sub-system by varying the control voltage applied to that node about what is assumed to be the optimum control voltage level, the optical signal at position downstream from the node is analyzed to ascertain the amplitude, frequency, and phase characteristics of the induced low-frequency modulation, and a determination is made, on the basis of the amplitude, frequency, and phase information, as to the whether the control voltage which was assumed to be optimal is indeed at the correct level to insure proper operation of the node. The amplitude of the induced low-frequency modulation may be maintained at low level so as not to interfere with the transmission of the primary information and data carried by the optical signal. Analysis of the amplitude, frequency, and phase of the modulated signal may be performed at a single fixed location within the network. Furthermore, multiple switching nodes may be monitored simultaneously from a single location within the network by modulating each node at a unique frequency. This allows each modulated signal received to be differentiated from all others, and readily identified as having originated at a particular node.

30 Claims, 6 Drawing Sheets

AUTOMATIC ON-LINE MONITORING AND OPTIMIZATION OF OPTICAL NETWORK SWITCHING NODES

TECHNICAL FIELD

The invention relates to the monitoring of control parameters associated with optical switches within a network for the transmission of optical signals.

BACKGROUND OF THE INVENTION

Within large photonic networks, such as those used to facilitate optical communications, it is necessary to monitor the performance of individual switching nodes to determine if the control parameters (i.e., control voltages) associated with each node require adjustment. It is critical that such control parameters be maintained within prescribed limits to insure the proper operation of the overall network. This monitoring is particularly important for switching and sub-systems which exhibit an analog switching response (a continuous switching curve with a finite slope between the "on" and "off" switching states). Solid-state guided-wave voltage-controlled directional couplers, such as those based upon lithium-niobate and indium-phosphide architectures, are one type of sub-system with this type of switching response. In addition, such solid-state devices are particularly susceptible to performance fluctuations resulting from thermal variations, aging, etc., increasing the need for performance monitoring.

Previously, the monitoring of control parameters for such optical switches and sub-systems was performed manually on a node-by-node basis using methods which caused an interruption in signals passing through the particular node being tested. This method is impractical for maintaining a large network. Ideally, in a large network it would be desirable to effect such performance monitoring on an automatic basis, and in a fashion which does not interfere with the transmission of the primary optical signals carried over the network.

SUMMARY OF THE INVENTION

The aforementioned problems are solved, in accordance with the principles of the invention, by inducing a low-frequency modulation onto an optical signal as it passes through a node within a switch or sub-system in response to variations in a control voltage applied to that node about what is assumed to be the optimum control voltage level, analyzing the optical signal at a position downstream from the node to ascertain the amplitude, frequency, and phase characteristics of the induced low-frequency modulation, and determining, on the basis of these characteristics, if the control voltage which was assumed to be optimal is indeed the correct level to insure proper operation of the node. If this voltage is found to be at some incorrect level, it is adjusted accordingly to the optimal value. The amplitude of the induced low-frequency modulation may be maintained at a low level so as not to interfere with the transmission of the primary information and data carried by the optical signal. Analysis of the amplitude, frequency, and phase of the modulated signal may be performed at a single fixed location within the network. Furthermore, multiple switching nodes may be monitored simultaneously from a single location within the network by modulating each node at a unique frequency. This allows each modulated signal received to be differentiated from all others, and readily identified as having originated at a particular node.

DETAILED DESCRIPTION

Figure 1:
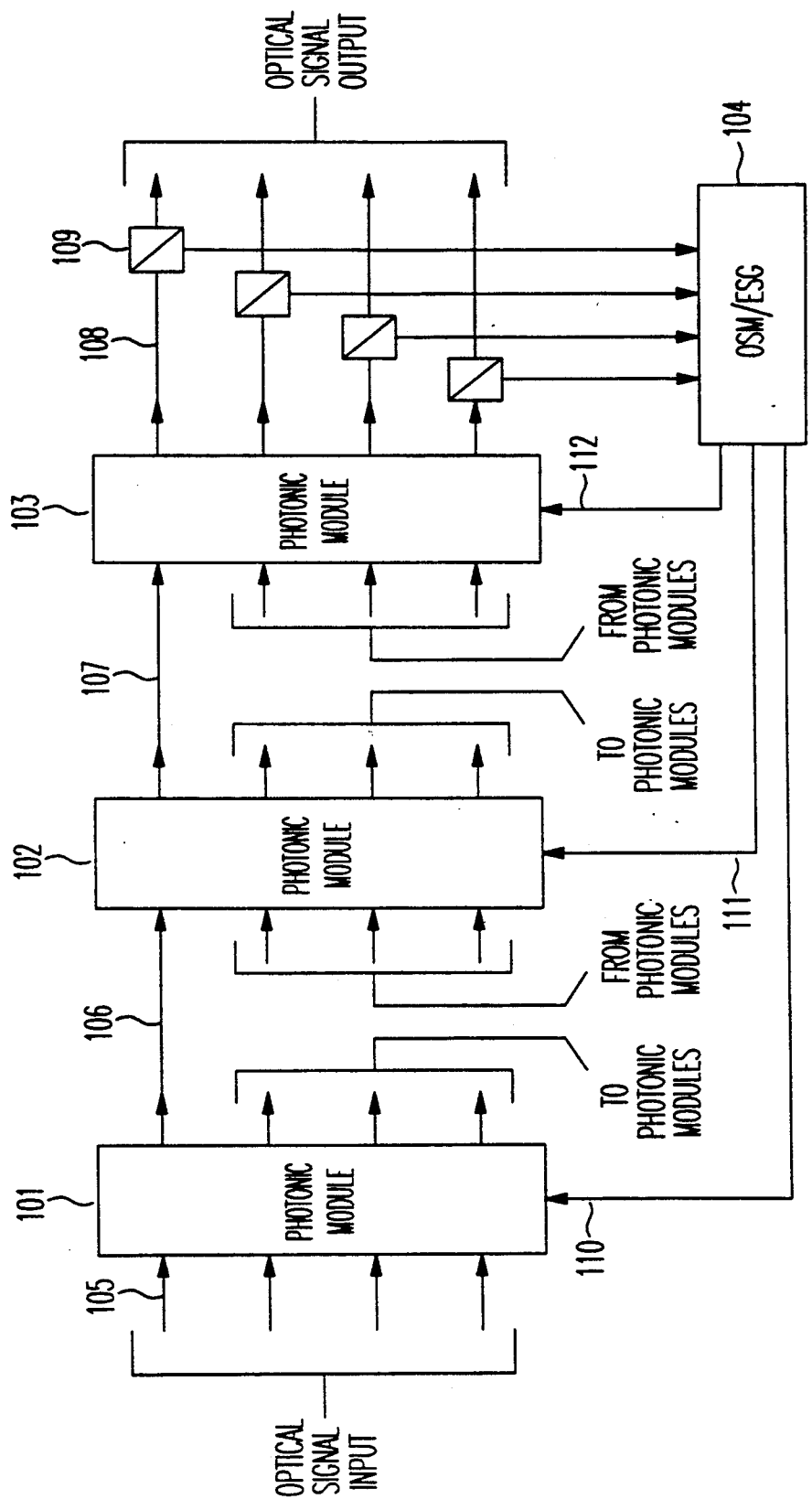
FIG. 1 shows, in simplified block diagram form, an optical communication system incorporating a particular embodiment of the invention.

FIG. 1 is a simplified block diagram showing an optical communication system incorporating a particular embodiment of this invention. As shown, three photonic modules (101, 102, and 103), an optical signal monitor/electrical signal generator ("OSM/ESG"), and optical transmission paths 105, 106, 107, and 108 are included in the system. Primary information bearing optical signals travel along these optical transmission paths from input to output. The photonic modules within this system are each opto-electronic integrated guided-wave switching devices of the type shown in FIG. 2. The optical switching within such guided-wave devices is controlled by the applying voltages or currents to control electrodes internal to the devices. Such switching devices (e.g., directional couplers) are typically fabricated from lithium-niobate, and are well known in the art.

Figure 2:
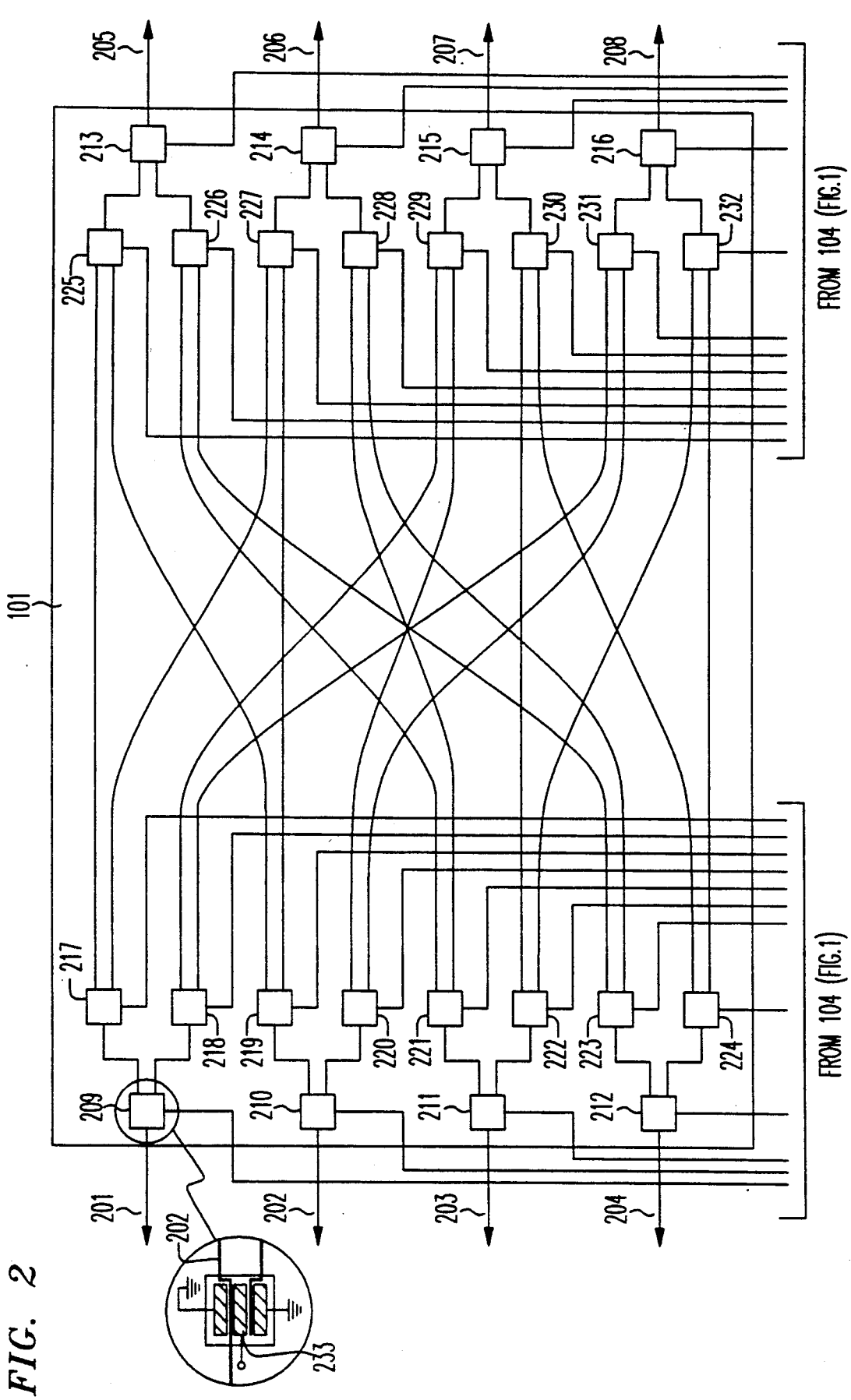
FIG. 2 shows, in simplified form, the internal architecture of one of the switching modules of FIG. 1.

FIG. 2 shows, in simplified form, the internal architecture of photonic module 101 of FIG. 1. Photonic module 101 (a 4×4 switch) accepts optical input signals from optical transmission paths via input lines 201, 202, 203, and 204, and outputs optical signals via lines 205–208. Transmission path 105 (FIG. 1) is connected to photonic module 101 via input line 201. A switching node having a control electrode is associated with each of the input and output lines in photonic module 101 (input nodes 209–212 and output nodes 213–216). Additional control electrodes (217–232) are associated with the sixteen intermediate optical switching nodes within photonic module 101. A detailed depiction of switching node 209 (which is associated with input line 201) is shown in FIG. 2. A voltage applied to electrode 233 regulates the transmission of optical signals through switching node 209.

Figure 3:
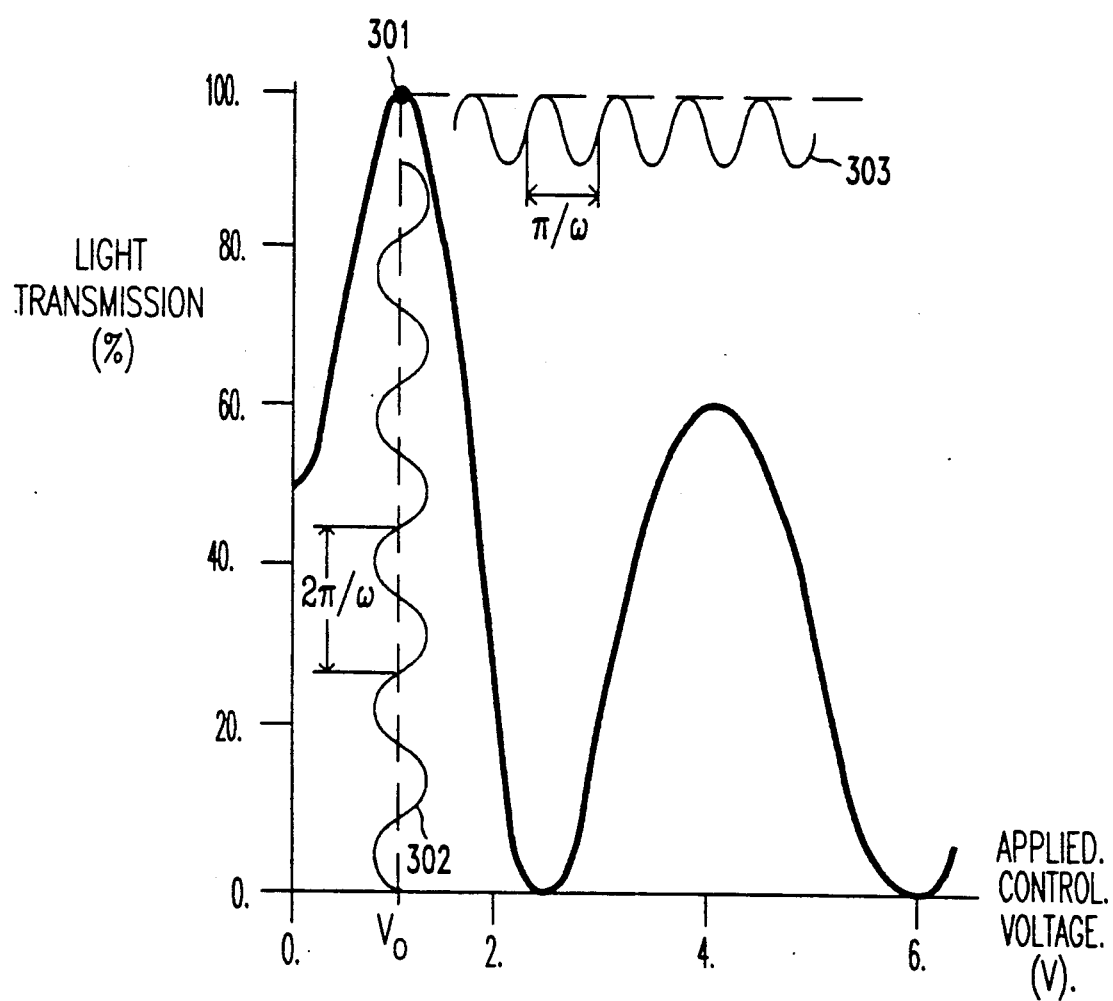
FIG. 3 is a graphical representation of typical transfer characteristics for a switching node such as those within the switching modules of FIG. 1, showing a modulation signal applied to a control voltage of $V_o$.
Figure 4:
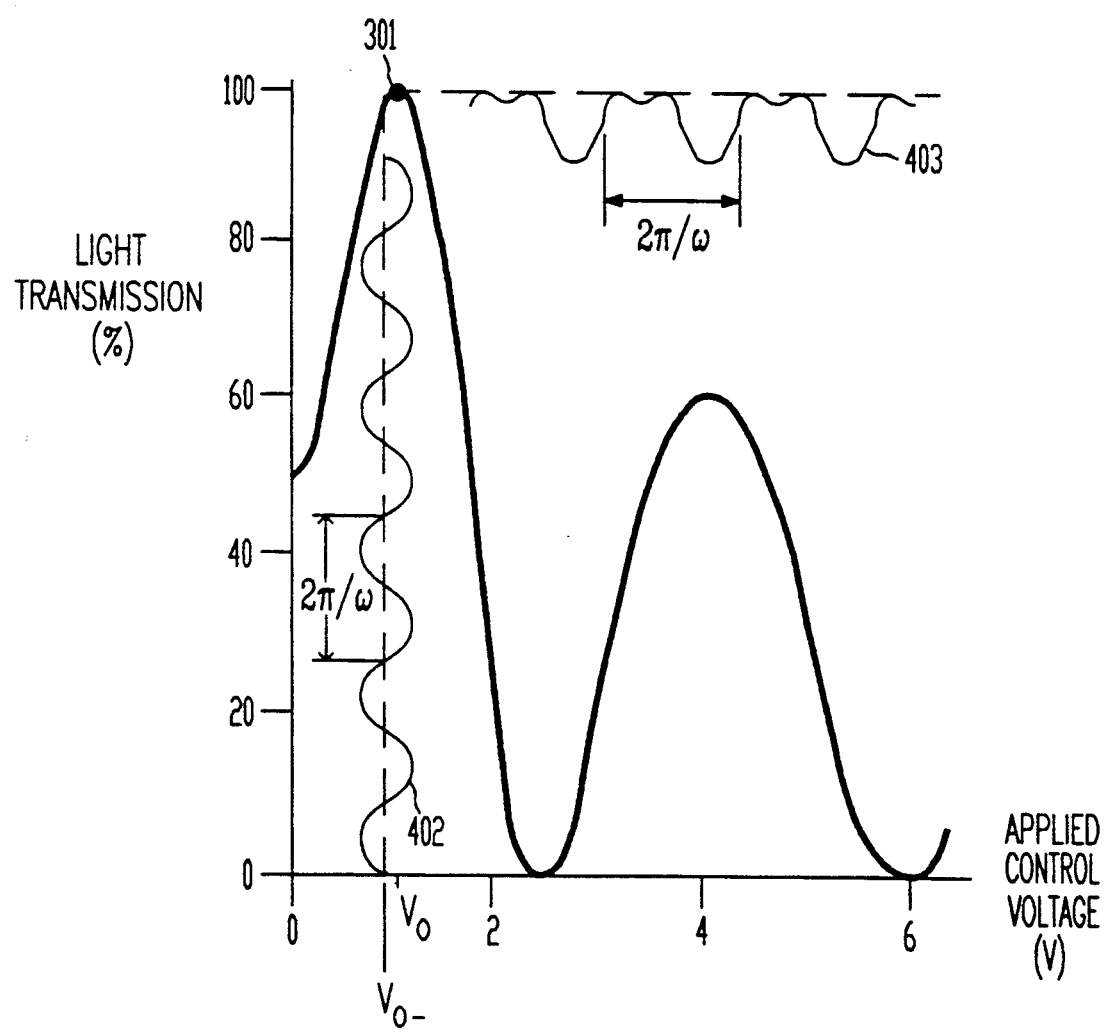
FIG. 4 is a graphical representation of typical transfer characteristics for a switching node such as those within the switching modules of FIG. 1, showing a modulation signal applied to a control voltage of $V_{o-}$.
Figure 5:
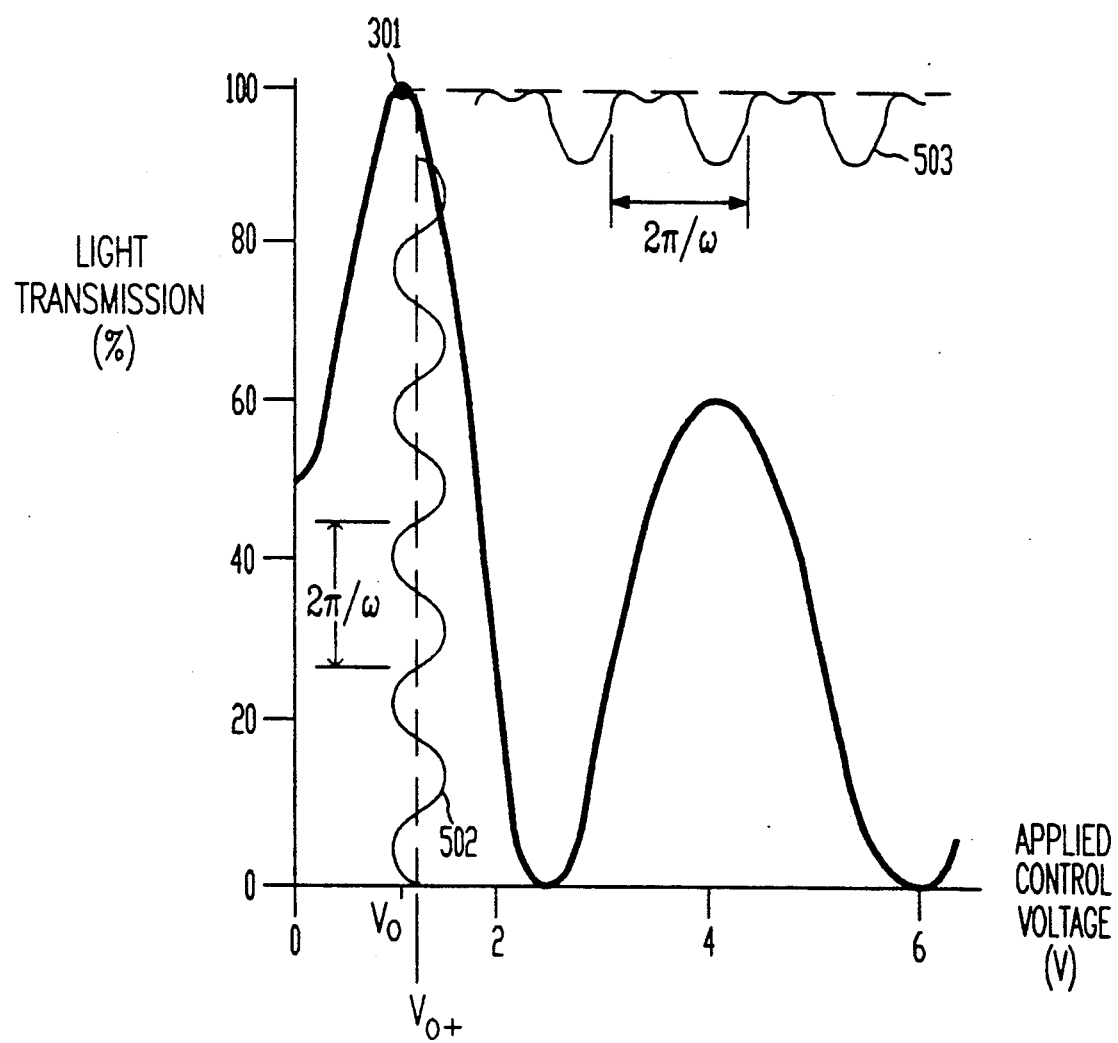
FIG. 5 is a graphical representation of typical transfer characteristics for a switching node such as those within the switching modules of FIG. 1, showing a modulation signal applied to a control voltage of $V_{o+}$.

FIG. 3 provides a graphical representation of the typical transfer characteristics for switching nodes such as those contained within photonic module 101. As shown, a maximum amount of light is transmitted through a switching node when the control voltage applied to that node is set to a bias point designated the "cross state" (shown as point 301 in FIG. 3). If a switching node is biased exactly at the cross state by a voltage $V_o$, and a small alternating voltage $V_m \sin(\omega t)$ is added to the control voltage, so that the total applied voltage is $[V_o + V_m \sin(\omega t)]$ (shown as waveform 302), the light output by the switching node is modulated accordingly (waveform 303). Note that this modulated output does not contain frequency components at the fundamental modulation frequency $\omega$, but rather only components at $2\omega$, $4\omega$ and higher even multiples of $\omega$. If, as shown in FIG. 4, the control voltage applied to a switching node is set to $V_{o-}$ (a voltage slightly less than that required to place the node at cross state bias point 301), then modulated output waveform 403 resulting from the application of voltage $[V_{o-} + V_m \sin(\omega t)]$ 402 contains frequency components at the fundamental modulation frequency $\omega$, and $3\omega$, $5\omega$, etc. As shown in FIG. 5, the same fundamental modulation frequency, and odd multiples thereof, would be produced if the control voltage applied was $[V_{o+} + V_m \sin(\omega t)]$, where $V_{o+}$ is a voltage slightly greater than that required to insure the maximum transmission of light through the switching node. The modulated optical signal (503) produced for a control voltage of $V_{o+}$ would be 180° out of phase with modulating voltage 502.

In practicing the invention within the optical communication system of FIG. 1, a low-frequency signal $V_m \sin(\omega t)$ is modulated onto the optical signals traveling along optical transmission path 105 at the input of photonic module 101. This optical modulation is accomplished by adding a modulating voltage (generated by OSM/ESG 104 of FIG. 1) to the control voltage being applied to control electrode 233 of switching node 209 (FIG. 2). The frequency $\omega$ is chosen so that it is well outside of the bandwidth of the primary optical signals being transmitted along optical path 105. For example, a 100 to 1000 Hz modulation frequency would be well outside the bandwidth of primary optical signals carried within an optical network capable of supporting 1 Gb/s transmissions. The amplitude of the modulated voltage would be kept to a minimum so as not to introduce too large a fluctuation in the level of the optical signal being modulated, thus insuring that the information carried by the primary optical signal will not be corrupted or interfered with.

In response to the modulated voltage, control electrode 233 causes the optical signal being transmitted along path 105, and entering photonic module 101 via input line 201 to be modulated. Other switching nodes within photonic module 101 are biased to allow the modulated optical signal to exit photonic module 101 at output line 205. The modulated signal propagates along optical transmission path 106. The switching nodes within photonic module 102 and photonic module 103 are biased so that the modulated signal on transmission path 106 is propagated to transmission paths 107 and 108, and to optical tap 109. Optical tap 109 routes a small portion of the modulated signal to OSM/ESG 104.

OSM/ESG 104 analyzes the received optical signal and determines the frequency components of the low-frequency modulation. As the modulation is low frequency, OSM/ESG 104 may employ an inexpensive, low-speed photo-sensor arrangement to detect the signal. If the received low-frequency modulation is found to have frequency components of $2\omega$, $4\omega$, $6\omega$, etc., the control voltage being applied to control electrode 233 of switching node 209 is biased to enable the maximum transmission of light through node 209. However, if the received low-frequency modulation is found to have frequency components of $\omega$, $3\omega$, $5\omega$, etc., the level of the control voltage being applied to switching node 209 requires adjustment. As discussed above with respect to FIGS. 4 and 5, the fundamental modulation frequency $\omega$, and odd multiples thereof, would be evident in a modulated signal only if the magnitude of control voltage applied to a particular switching node is either too great or too small. By comparing the phase of the fundamental modulation frequency $\omega$ detected in the received optical signal with that of the electrical signal inducing the modulation, it can be determined if the magnitude of the applied control voltage is too great (phase difference of 180°), or too small (phase difference of 0°). The control voltage applied to the switching node at which the modulation was introduced is adjusted accordingly, and the modulation of the optical signal as it passes through the node is repeated to determine if the adjustment has placed the node at the proper cross state bias point.

Figure 6:
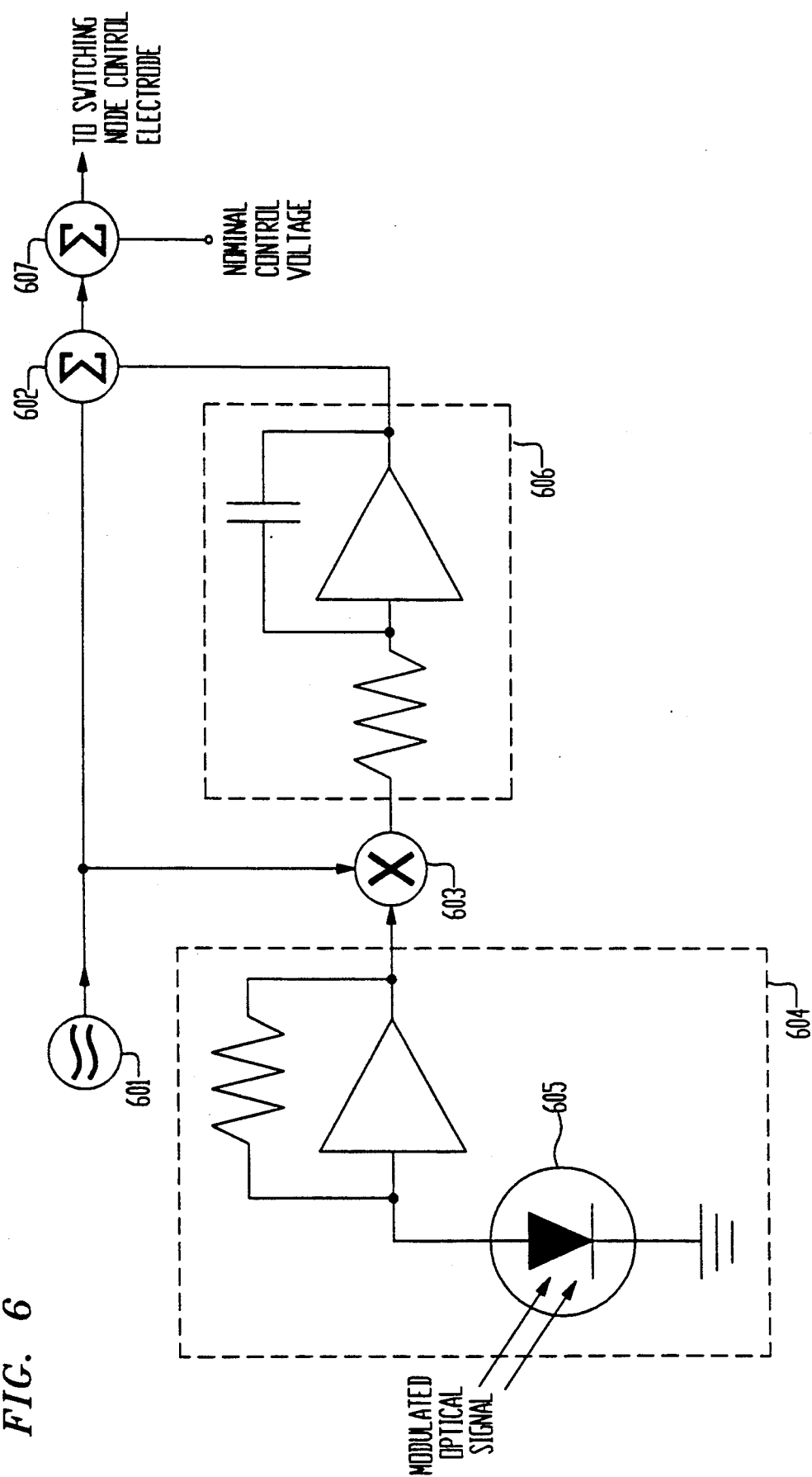
FIG. 6 is a simplified block diagram of an automatic control voltage adjustment circuit contained within the optical signal monitor/electrical signal generator of FIG. 1.

FIG. 6 is a simplified block diagram of a signal generation/detection circuit used to implement the automatic control voltage adjustment described above for switching node 209 (FIG. 2). Such a circuit is contained within OSM/ESG 104 shown in FIG. 1. Signal generator 601 produces a low-frequency electrical signal of frequency $\omega$ which is passed to summing element 602 and multiplier 603. The generated signal can be any symmetric waveform, such as a sinusoid or a saw-tooth. Multiplier 603 also receives an input signal from photo-detector circuit 604. The signal generated by photo-detector circuit 604 is proportional to the intensity of the light incident upon photo-diode 605. This incident light is a portion of the modulated optical signal tapped from transmission path 108 by optical tap 109 (FIG. 1). The signal from photo-detector circuit 604 is multiplied with the low frequency signal output by signal generator 601; the product is integrated by integrator 606 and passed to summing element 602 where it is added to the output of signal generator 601. Integrator 606 outputs a positive voltage when the signal produced by photo-detector circuit contains a high-amplitude frequency component having the same frequency as the output of signal generator 601, but phase-shifted 180° from the output of signal generator 601. Integrator 606 produces a negative voltage when the signal produced by photo-detector circuit contains a high-amplitude frequency component having the same frequency and phase as the output of signal generator 601. If the signal produced by photo-detector circuit does not contain a frequency component having the same frequency as the output of signal generator 601, integrator 606 outputs a zero level signal. Summing element 607 adds the output of summing element 602 to a nominal control voltage being applied to switching node 209. The sum of these two signals is then applied, via control path 110 (FIG. 1), to control electrode 233 of switching node 209 (FIG. 2).

As described above, the output of integrator 606 varies as a function of the amplitude, frequency, and phase of the signal produced by photo-detector circuit 604. This results in the output of summing element 607 providing a voltage to control electrode 233 of switching node 209 (FIG. 2) which is actively adjusted so that switching node 209 is maintained at an optimal cross state bias point.

The monitoring and optimization technique can be applied to each of the twenty four switching nodes within photonic module 101. The technique may be practiced sequentially upon individual nodes, or simultaneously upon multiple nodes by employing multiple signal generation/detection circuits. When practiced simultaneously, the control voltage at each nodes is modulated at a unique frequency. Each of these unique frequencies is chosen so that one is not a multiple harmonic of another. This allows the modulated optical signal received from any particular node to be differentiated from all other received signals. The above described techniques may also be applied to switching nodes within photonic modules 102 and 103 (via signals sent over control paths 111 and 112, respectively).

The monitoring and optimization scheme may also be employed in a similar fashion if the switching node is to be set in the "bar state." In this state, light is channeled through the switching node in a direction other than the direction selected in the cross state. The transfer characteristic for the bar state is essentially the complement of the characteristics depicted in FIGS. 3, 4, and 5. Again, the above described technique is employed to optimize the control voltage applied to the switching node for maximum transmission of light along the desired path.

The invention provides for the practical, on-line monitoring and optimization of optical switch control parameters within an optical communication system. It will be understood that the particular methods described are only illustrative of the principles of the present invention, and that various modifications could be made by those skilled in the art without departing from the scope and spirit of the present invention, which is limited only by the claims that follow.

One such modification would include generating the electrical signals provided to the switching nodes in the above described examples at a plurality of individual electrical signal generators; each of these generators being dedicated to a particular photonic module, photonic module port, or group of photonic module ports.

We claim:

1. A method for monitoring the performance of an optical switching node exhibiting an analog switching characteristic responsive to control parameters, wherein an optical signal is transmitted through said switching node via an optical path, comprising the steps of:
    modulating at said switching node, in response to an electrical signal generated at a signal source, the amplitude of said optical signal;
    monitoring said optical path at a fixed position to detect the amplitude, frequency and phase characteristics of said modulated optical signal; and
    evaluating the performance of said switching node as a function of said detected amplitude, frequency and phase characteristics.

2. The method of claim 1 wherein said control parameters are modified to optimize the performance of said switching node as a function of said detected amplitude, frequency and phase characteristics.

3. The method of claim 1 wherein said modulated optical signal contains information indicating the identity of the switching node at which it was modulated.

4. The method of claim 1 wherein, in response to said electrical signal generated at a signal source, said optical signal is modulated at a frequency outside of the bandwidth of any primary information carried by said optical signal.

5. The method of claim 1 wherein, in response to said electrical signal generated at a signal source, the amplitude of said optical signal is modulated so as not to interfere with the transmission of any primary information carried by said optical signal.

6. A method for monitoring the performance of a plurality of optical switching nodes exhibiting an analog switching characteristic responsive to control parameters, wherein an optical signal is transmitted through said switching nodes via an optical path, comprising the steps of:
    modulating, in response to generated electrical signals, an optical signal at each of said plurality of switching nodes;
    monitoring said optical path at a fixed position to detect the amplitude, frequency and phase characteristics of said modulated optical signals; and
    evaluating the performance of each of said plurality of switching nodes as a function of said detected amplitude, frequency and phase characteristics.

7. The method of claim 6 wherein said control parameters are modified to optimize the performance of each of said plurality of switching nodes as a function of said detected amplitude, frequency and phase characteristics.

8. The method of claim 6 wherein said modulated optical signals each contain information indicating the identity of the switching node at which it was modulated.

9. The method of claim 6 wherein, in response to said generated electrical signals, said optical signal is modulated at a frequency outside of the bandwidth of any primary information carried by said optical signal.

10. The method of claim 6 wherein, in response to said generated electrical signals, the amplitude of said optical signal is modulated so as not to interfere with the transmission of any primary information carried by said optical signal.

11. A method for monitoring the performance of a plurality of optical switching nodes exhibiting an analog switching characteristic responsive to control parameters, wherein an optical signal is transmitted through said switching nodes via an optical path, comprising the steps of:
    modulating, in response to electrical signals generated at a single signal source, an optical signal at each of said plurality of switching nodes;
    monitoring said optical path at a fixed position to detect the amplitude, frequency and phase characteristics of said modulated optical signals; and
    evaluating the performance of each of said plurality of switching nodes as a function of said detected amplitude, frequency and phase characteristics.

12. The method of claim 11 wherein said control parameters are modified to optimize the performance of each of said plurality of switching nodes as a function of said detected amplitude, frequency and phase characteristics.

13. The method of claim 11 wherein said modulated optical signals each contain information indicating the identity of the switching node at which it was modulated.

14. The method of claim 11 wherein, in response to said electrical signals generated at said single signal source, said optical signal is modulated at a frequency outside of the bandwidth of any primary information carried by said optical signal.

15. The method of claim 11 wherein, in response to said electrical signals generated at said single signal source, the amplitude of said optical signal is modulated so as not to interfere with the transmission of any primary information carried by said optical signal.

16. Apparatus for monitoring the performance of an optical switching node exhibiting an analog switching characteristic responsive to control parameters, wherein an optical signal is transmitted through said switching node via an optical path, comprising:
   means for modulating at said switching node, in response to an electrical signal generated at a signal source, the amplitude of said optical signal;
   means for monitoring said optical path at a fixed position to detect the amplitude, frequency and phase characteristics of said modulated optical signal; and
   means for evaluating the performance of said switching node as a function of said detected amplitude, frequency and phase angle characteristics.

17. The invention of claim 16 wherein said control parameters are modified to optimize the performance of said switching node as a function of said detected amplitude, frequency and phase characteristics.

18. The invention of claim 16 wherein said modulated optical signal contain information indicating the identity of the switching node at which it was modulated.

19. The invention of claim 16 wherein, in response to said electrical signal generated at a signal source, said optical signal is modulated at a frequency outside of the bandwidth of any primary information carried by said optical signal.

20. The invention of claim 16 wherein, in response to said electrical signal generated at a signal source, the amplitude of said optical signal is modulated so as not to interfere with the transmission of any primary information carried by said optical signal.

21. Apparatus for monitoring the performance of a plurality of optical switching nodes exhibiting an analog switching characteristic responsive to control parameters, wherein an optical signal is transmitted through said switching nodes via an optical path, comprising:
   means for modulating, in response to generated electrical signals, an optical signal at each of said plurality of switching nodes;
   means for monitoring said optical path at a fixed position to detect the amplitude, frequency and phase characteristics of said modulated optical signals; and
   means for evaluating the performance of each of said plurality of switching nodes as a function of said detected amplitude, frequency and phase characteristics.

22. The invention of claim 21 wherein said control parameters are modified to optimize the performance of each of said plurality of switching nodes as a function of said detected amplitude, frequency and phase characteristics.

23. The invention of claim 21 wherein said modulated optical signals each contain information indicating the identity of the switching node at which it was modulated.

24. The invention of claim 21 wherein, in response to said generated electrical signals, said optical signal is modulated at a frequency outside of the bandwidth of any primary information carried by said optical signal.

25. The invention of claim 21 wherein, in response to said generated electrical signals, the amplitude of said optical signal is modulated so as not to interfere with the transmission of any primary information carried by said optical signal.

26. Apparatus for monitoring the performance of a plurality of optical switching nodes exhibiting an analog switching characteristic responsive to control parameters, wherein an optical signal is transmitted through said switching nodes via an optical path, comprising:
   means for modulating, in response to electrical signals generated at a single signal source, an optical signal at each of said plurality of switching nodes;
   means for monitoring said optical path at a fixed position to detect the amplitude, frequency and phase characteristics of said modulated optical signals; and
   means for evaluating the performance of each of said plurality of switching nodes as a function of said detected amplitude, frequency and phase characteristics.

27. The invention of claim 26 wherein said control parameters are modified to optimize the performance of each of said plurality of switching nodes as a function of said detected amplitude, frequency and phase characteristics.

28. The invention of claim 26 wherein said modulated optical signals each contain information indicating the identity of the switching node at which it was modulated.

29. The invention of claim 26 wherein, in response to said electrical signals generated at said single signal source, said optical signal is modulated at a frequency outside of the bandwidth of any primary information carried by said optical signal.

30. The invention of claim 26 wherein, in response to said electrical signals generated at said single signal source, the amplitude of said optical signal is modulated so as not to interfere with the transmission of any primary information carried by said optical signal.

* * * * *